US008731298B2

(12) United States Patent
Oda

(10) Patent No.: US 8,731,298 B2
(45) Date of Patent: May 20, 2014

(54) CHARACTER RECOGNITION APPARATUS, CHARACTER RECOGNITION METHOD, AND COMPUTER READABLE MEDIUM STORING PROGRAM

(75) Inventor: Hideto Oda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 211 days.

(21) Appl. No.: 13/190,224

(22) Filed: Jul. 25, 2011

(65) Prior Publication Data

US 2012/0213442 A1    Aug. 23, 2012

(30) Foreign Application Priority Data

Feb. 21, 2011    (JP) ................................. 2011-034900

(51) Int. Cl.
*G06K 9/00* (2006.01)
(52) U.S. Cl.
USPC ......................................................... 382/181
(58) Field of Classification Search
USPC ......................................................... 382/181
See application file for complete search history.

(56) References Cited

U.S. PATENT DOCUMENTS

| | | | | |
|---|---|---|---|---|
| 4,611,346 A * | 9/1986 | Bednar et al. | ................. | 382/174 |
| 6,243,701 B1 * | 6/2001 | Shih et al. | ............................. | 1/1 |
| 6,751,605 B2 * | 6/2004 | Gunji et al. | ........................... | 1/1 |

FOREIGN PATENT DOCUMENTS

| JP | 05-012245 A | 1/1993 |
|---|---|---|
| JP | 06-076098 A | 3/1994 |
| JP | 07-262314 A | 10/1995 |
| JP | 09-231316 A | 9/1997 |

OTHER PUBLICATIONS (De Cao Tran, "Accented Handwritten Character Recognition Using SVM-Application to French", 2010, 12$^{th}$ International Conference on Frontiers in Handwritting Recogntion, IEEE).*

* cited by examiner

*Primary Examiner* — Samir Ahmed
*Assistant Examiner* — Totam Le
(74) *Attorney, Agent, or Firm* — Sughrue Mion, PLLC

(57) ABSTRACT

A character recognition apparatus includes an acquisition unit, a specification unit, a movement unit, and a recognition unit. The acquisition unit acquires data representing a character string. The specification unit specifies an element of a compound character satisfying a predetermined condition for determining the compound character from the character string. The movement unit moves the element of the compound character close to an adjacent character. The recognition unit recognizes a changed character string in which the movement unit has moved the element of the compound character, based on a shape of characters and relevance between adjacent characters.

14 Claims, 6 Drawing Sheets

CHARACTER RECOGNITION APPARATUS, CHARACTER RECOGNITION METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-034900 filed Feb. 21, 2011.

BACKGROUND (i) Technical Field

The present invention relates to a character recognition apparatus, a character recognition method, and a computer readable medium storing a program.

(ii) Related Art

Character recognition techniques for converting handwritten characters into text data have been available.

SUMMARY

According to an aspect of the invention, there is provided a character recognition apparatus including an acquisition unit, a specification unit, a movement unit, and a recognition unit. The acquisition unit acquires data representing a character string. The specification unit specifies an element of a compound character satisfying a predetermined condition for determining the compound character from the character string. The movement unit moves the element of the compound character close to an adjacent character. The recognition unit recognizes a changed character string in which the movement unit has moved the element of the compound character, based on a shape of characters and relevance between adjacent characters.

BRIEF DESCRIPTION OF THE DRAWINGS

Exemplary embodiment(s) of the present invention will be described in detail based on the following figures, wherein.

DETAILED DESCRIPTION

Figure 1:
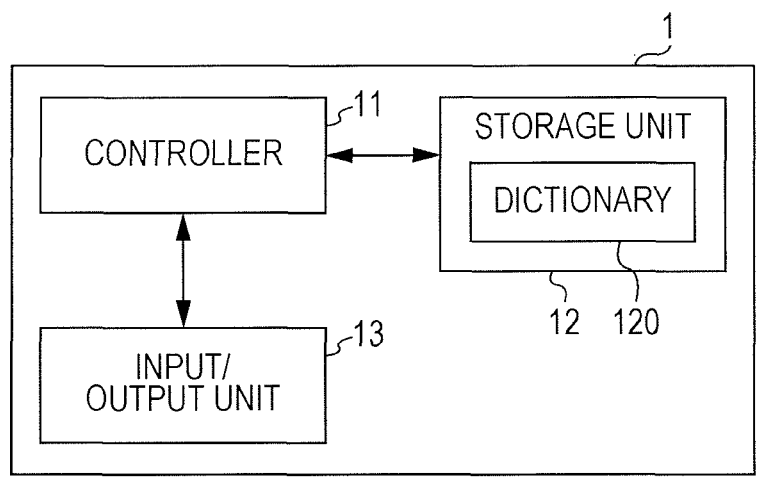
FIG. 1 illustrates the configuration of a character recognition apparatus.

FIG. 1 illustrates the configuration of a character recognition apparatus 1 according to an exemplary embodiment. The character recognition apparatus 1 includes a controller 11, a storage unit 12, and an input/output unit 13. The controller 11 includes a central processing unit (CPU) and a memory. The CPU executes a program stored in the memory to perform various processes. The storage unit 12 includes, for example, a non-volatile memory and stores a dictionary 120 used for character recognition. The input/output unit 13 exchanges data with an external apparatus.

Figure 2:
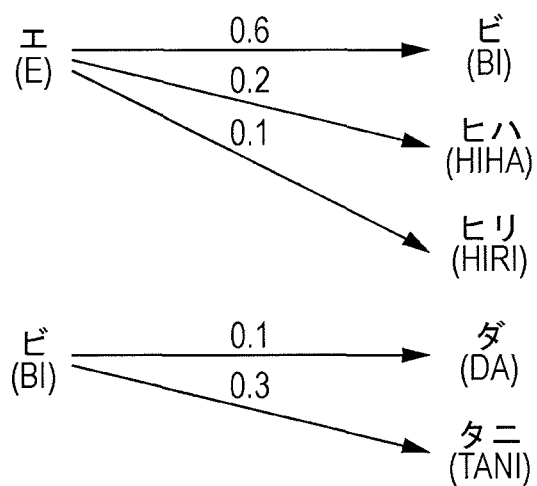
FIG. 2 illustrates example transition probabilities contained in a dictionary.

The dictionary 120 may contain plural person names. The dictionary 120 may also contain transition probabilities each indicating a degree of probability that a transition in the name of a person from a first character to a second character will occur. Each of the first and second characters may be one character or may include plural characters. FIG. 2 illustrates example transition probabilities contained in the dictionary 120. In FIG. 2, in the dictionary 120, the transition probability from Japanese character "E" to Japanese character "BI" is 0.6, the transition probability from Japanese character "E" to Japanese characters "HIHA" is 0.2, and the transition probability from Japanese character "E" to Japanese characters "HIRI" is 0.1. That is, a character string in which Japanese character "E" is followed by Japanese character "BI" may be more probable than a character string in which Japanese character "E" is followed by Japanese characters "HIHA" or Japanese characters "HIRI".

Figure 3:
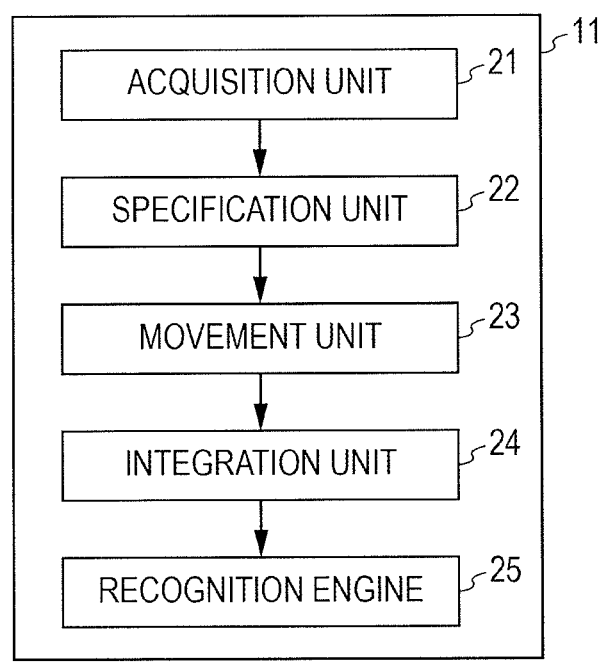
FIG. 3 illustrates the functional configuration of a controller.

FIG. 3 illustrates the functional configuration of the controller 11. The controller 11 may function as an acquisition unit 21, a specification unit 22, a movement unit 23, an integration unit 24, and a recognition engine 25. The acquisition unit 21 acquires data representing a character string. The character string may be written in, for example, plural separate areas. The specification unit 22 specifies a character satisfying predetermined conditions for determining an element of a compound character composed of plural elements from the character string represented by the data acquired by the acquisition unit 21. The movement unit 23 moves the character specified by the specification unit 22 so that the specified character and a character that is another element of the compound character when the specified character is the element of the compound character may be close to each other. The integration unit 24 integrates an area where the character moved by the movement unit 23 is written and an area where a character that is another element of the compound character when the moved character is the element of the compound character. The recognition engine 25 recognizes a character string in which the movement unit 23 has moved a character in accordance with the shape of a character and the relevance between adjacent characters. For example, if the character to be recognized is written in an area that is not integrated by the integration unit 24, the recognition engine 25 specifies one character as a recognition candidate on the basis of the shape of the character. If the character to be recognized is written in an area that is integrated by the integration unit 24, the recognition engine 25 specifies one character or plural characters as a recognition candidate or recognition candidates on the basis of the shape of the character. Subsequently, the recognition engine 25 specifies plural characters as recognition candidates on the basis of the shape of the character to be recognized. Then, the recognition engine 25 selects the character having the highest probability of appearing after the character preceding the character to be recognized from among the plural specified characters on the basis of the transition probabilities stored in the storage unit 12.

Figure 4:
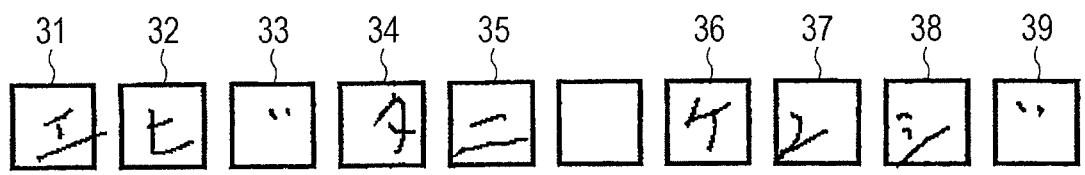
FIG. 4 illustrates an example character string.

Next, the operation of the character recognition apparatus 1 will be described. The character recognition apparatus 1 receives input data representing a character string via the input/output unit 13. FIG. 4 illustrates an example character string represented by input data. The characters included in the character string are individually written in writing boxes 31 to 39. The writing boxes 31 to 39 are separate areas. The size and position of the writing boxes 31 to 39 are determined in advance. The character string includes compound Japanese characters "BI" and "JI" each composed of plural elements. The compound Japanese character "BI" is composed of Japanese character "HI" with a voiced mark which is a Japanese diacritical mark, called dakuten, which results in the consonant "h" being pronounced voiced. As illustrated in FIG. 4, the Japanese character "HI" and the dakuten are written in different writing boxes. Similarly, the compound Japanese character "JI" is composed of Japanese character "SHI" with the dakuten, which results in the consonant "sh" being pronounced voiced. As illustrated in FIG. 4, the Japanese character "SHI" and the dakuten are written in different writing boxes. The controller 11 performs the following process upon acquisition of input data via the input/output unit 13.

Figure 5:
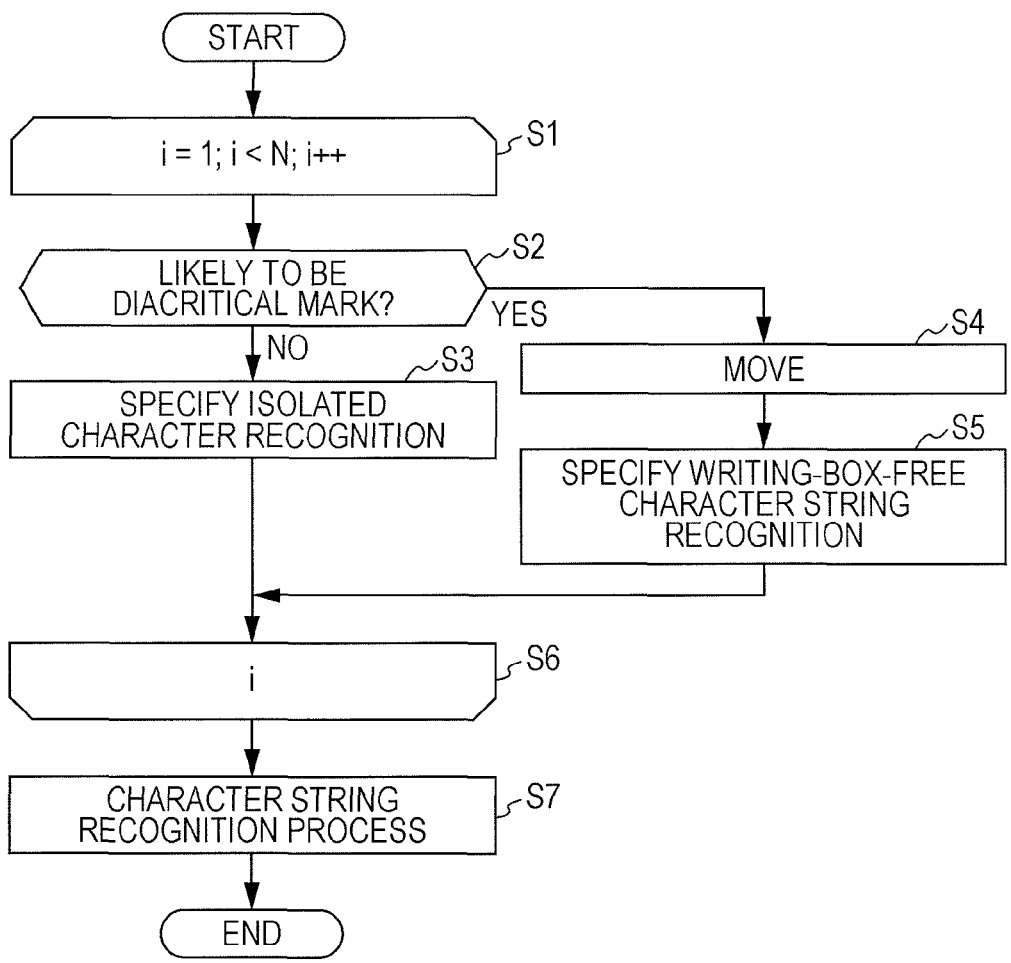
FIG. 5 is a flowchart illustrating a process performed by the controller.

FIG. 5 is a flowchart illustrating a process performed by the controller 11. In step S1, the controller 11 sets a variable i to the initial value 1. The controller 11 also sets a variable N. Specifically, the controller 11 calculates the number of characters written in writing boxes on the basis of the input data. Then, the value 1 is added to the value equal to the number of characters and the obtained value is set as the variable N. In FIG. 4, nine characters are written in the writing boxes 31 to 39. Therefore, the value obtained by adding the value 1 to the value 9, i.e., 10, is set as the variable N. So long as the variable i is smaller than N, the controller 11 adds the value 1 to the variable i, and repeats the processing of steps S1 to S6.

In step S2, the controller 11 determines, based on the input data, whether or not the i-th character is likely to be a diacritical mark. The diacritical mark is used here in the context of a Japanese diacritical mark, that is, a voiced mark ("dakuten") or a semi-voiced mark ("handakuten"). The dakuten and the handakuten are marks with which to indicate a voiced syllable (e.g., /h/ with the dakuten should be pronounced /b/, and /h/ with the handakuten should be pronounced /p/.) The dakuten resembles a quotation mark (") and the handakuten looks like a "degree" symbol (small circle). The term "i-th" denotes the position of a character in a character string. Therefore, the character in the first position of a character string is the first character, and the character that follows is the second character. The controller 11 specifies a character having a probability of being a diacritical mark, by using predetermined conditions for determining a diacritical mark. Here, the conditions that a character is located in the upper two thirds of a writing box and is made up of two strokes or less may be used to specify a character having a probability of being a diacritical mark. In FIG. 4, the character written in the writing box 33 is located in the upper two thirds of the writing box 33, and is made up of two strokes or less. Similarly, the character written in the writing box 39 is located in the upper two thirds of the writing box 39, and is made up of two strokes or less. In this case, it is determined that the characters written in the writing boxes 33 and 39 are likely to be diacritical marks. The other characters do not meet the above conditions, and therefore it is determined that the other characters are not likely to be diacritical marks.

If the i-th character is not likely to be a diacritical mark (NO in step S2), the controller 11 proceeds to step S3. In step S3, the controller 11 specifies isolated character recognition as a method to be used to recognize the i-th character. Therefore, the isolated character recognition is applied to the characters written in the writing boxes other than the writing boxes 33 and 39 illustrated in FIG. 4. The isolated character recognition is a character recognition method based on the assumption that one character is written in one separate writing box. In the isolated character recognition, therefore, one character is recognized from one writing box. If the i-th character is likely to be a diacritical mark (YES in step S2), the controller 11 proceeds to step S4.

Figure 6:
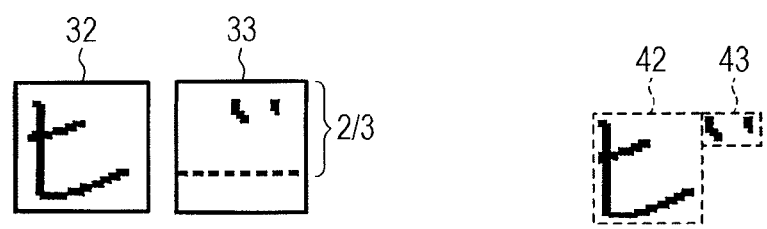
FIG. 6 illustrates movement of a character.

In step S4, the controller 11 moves the i-th character so that the i-th character and the (i-1)-th character may be closer to each other. In FIG. 4, the character written in the writing box 33 and the character written in the writing box 39 are moved. FIG. 6 illustrates the movement of the characters. In FIG. 6, by way of example, the character written in the writing box 33 is the i-th character, and the character written in the writing box 32 is the (i-1)-th character. First, the controller 11 determines a rectangular boundary 43 that defines the character written in the writing box 33 and a rectangular boundary 42 that defines the character written in the writing box 32. Then, the controller 11 moves the character written in the writing box 33 until the rectangular boundary 43 and the rectangular boundary 42 join together. The movement of the character reduces the distance between the character written in the writing box 33 and the character written in the writing box 32, thus allowing the reader to easily recognize the characters in the writing boxes 32 and 33 as a single compound character.

Figure 7:
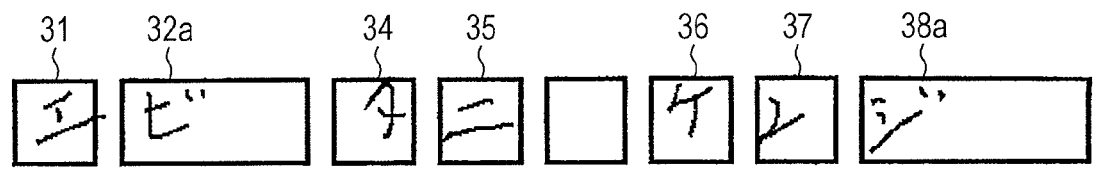
FIG. 7 illustrates example integrated writing boxes.

In step S5, the controller 11 integrates the writing box where the i-th character is written and the writing box where the (i-1)-th character is written. In FIG. 4, the writing boxes 32 and 33 are integrated, and further the writing boxes 38 and 39 are integrated. FIG. 7 illustrates example integrated writing boxes. In FIG. 7, the writing boxes 32 and 33 illustrated in FIG. 4 are integrated to generate an integrated writing box 32a. Further, the writing boxes 38 and 39 illustrated in FIG. 4 are integrated to generate an integrated writing box 38a. Integrating writing boxes means that characters written in plural, unintegrated writing boxes are handled as a single aggregate for character recognition. Therefore, the size and shape of an integrated writing box may be determined so that the integrated writing box may include characters handled as a single aggregate. Then, the controller 11 specifies writing-box-free character string recognition as a method to be used to recognize a character or characters written in an integrated writing box. Thus, the writing-box-free character string recognition is applied to the characters written in the integrated writing boxes 32a and 38a illustrated in FIG. 7. The writing-box-free character string recognition is a character recognition method based on the assumption that the number of characters written in one writing box is undefined. In the writing-box-free character string recognition, therefore, one or plural characters are recognized from one writing box. The writing-box-free character string recognition does not limit the number of characters written in a writing box, and therefore, in general, provides a lower character recognition accuracy than the isolated character recognition. In step S6, when the variable i is equal to the variable N, the controller 11 stops repeating the process.

Figure 8:
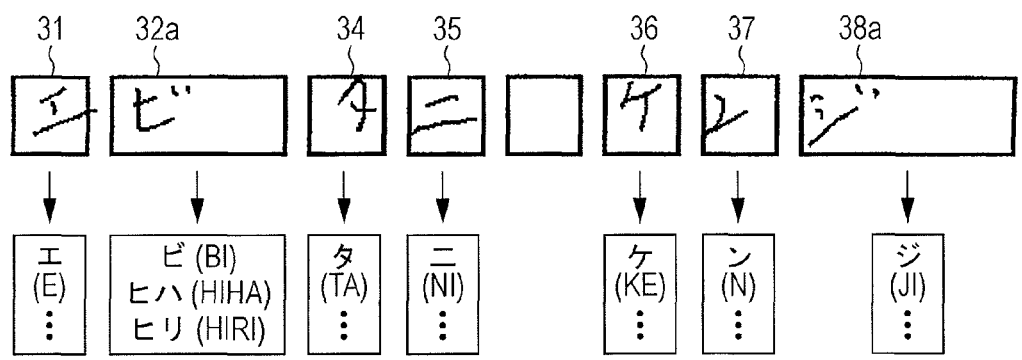
FIG. 8 illustrates a process for recognizing a character string.

In step S7, the controller 11 performs a process for recognizing a character string in which a character has been moved, using the dictionary 120 stored in the storage unit 12. FIG. 8 illustrates a process for recognizing a character string. First, the controller 11 specifies a character that may be a recognition candidate on the basis of the shape of a character written in each writing box. In this case, the controller 11 specifies one character in each of the writing boxes 31 and 34 to 37 using the isolated character recognition. On the other hand, the controller 11 specifies one or plural characters in each of the integrated writing boxes 32a and 38a using the writing-box-free character string recognition.

Then, the controller 11 performs contextual processing to select a character with a high relevance to an adjacent character from among characters specified as recognition candidates. In FIG. 8, Japanese character "BI", Japanese characters "HIHA", and Japanese characters "HIRI" are specified as recognition candidates of the character or characters written in the writing box 32a. In this case, the controller 11 selects a character having the highest probability of appearing after the character written in the writing box 31 from among the characters specified as recognition candidates, in accordance with the transition probabilities from the character written in the writing box 31 to the respective characters. Here, by way of example, Japanese character "E" is recognized as the character written in the writing box 31. In FIG. 2, the transition probability from Japanese character "E" to Japanese character "BI" is 0.6, the transition probability from Japanese character "E" to Japanese characters "HIHA" is 0.2, and the transition probability from Japanese character "E" to Japanese characters "HIRI" is 0.1. In this case, the transition probability from Japanese character "E" to Japanese character "BI" is the highest, and therefore Japanese character "BI" is selected.

After a character string is recognized in the manner described above, the controller 11 generates text data representing the recognized character string. The generated text data is output to an external apparatus from the input/output unit 13. For example, the text data may be output to an image forming apparatus. In this case, the image forming apparatus forms the character string represented by the text data output from the character recognition apparatus 1 on a sheet of paper. Alternatively, the text data may be output to a display apparatus. In this case, the display apparatus displays the character string represented by the text data output from the character recognition apparatus 1.

In FIG. 4, the character written in the writing box 35 is not a diacritical mark but is made up of two strokes or less. Thus, for example, if the character is written in the upper two thirds of the writing box 35, in step S2, it may be erroneously determined that the character is likely to be a diacritical mark. In this case, in step S4, the character written in the writing box 35 is moved so that the character written in the writing box 35 and the character written in the writing box 34 may be close to each other. In step S5, the writing boxes 34 and 35 are integrated to generate the integrated writing box 34a. Then, the writing-box-free character string recognition is specified as a method to be used to recognize a character or characters written in the integrated writing box 34a is specified.

Figure 9:
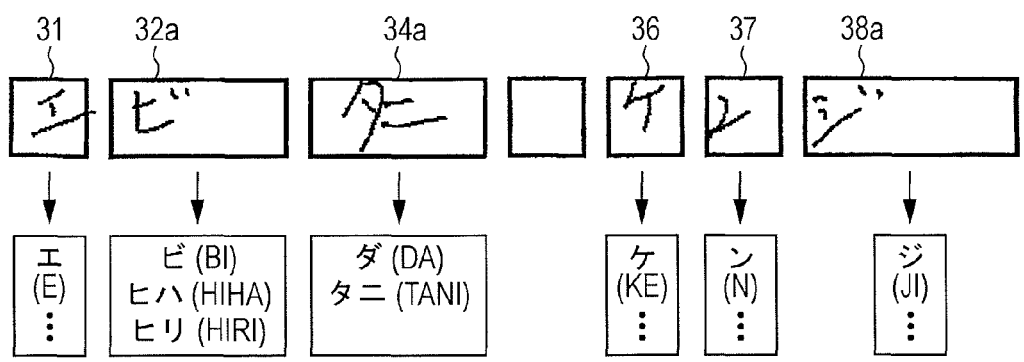
FIG. 9 illustrates a process for recognizing a character string.

Then, in step S7, characters as illustrated in FIG. 9 are specified as recognition candidates on the basis of the shape of a character or characters written in the integrated writing box 34a. The Japanese character "NI" written in the integrated writing box 34a may be similar in shape to the dakuten mark which looks like a quotation mark. For this reason, in FIG. 9, Japanese character "DA" as well as Japanese characters "TANI" is specified as a recognition candidate of the character or characters written in the integrated writing box 34a. Here, by way of example, Japanese character "BI" is recognized as the character written in the writing box 32a. In FIG. 2, the transition probability from Japanese character "BI" to Japanese character "DA" is 0.1, and the transition probability from Japanese character "BI" to Japanese characters "TANI" is 0.3. In this case, the transition probability from Japanese character "BI" to Japanese characters "TANI" is the highest, and therefore Japanese characters "TANI" are selected.

In this exemplary embodiment, therefore, if a character that is likely to be a diacritical mark is specified, whether or not the character and the preceding character are combined to create one compound character is determined using contextual processing. Therefore, even if a character that is not actually a diacritical mark is erroneously determined to be likely to be a diacritical mark, the character may be corrected to a correct character using contextual processing.

The present invention is not intended to be limited to the foregoing exemplary embodiment, and a variety of modifications may be made. Several modifications will be described hereinafter. The following modifications may be implemented in combination.

First Modification

A character string may include symbols and numbers. Some symbols and numbers are composed of plural elements, such as the "degree Celsius" symbol, fractions, and numbers in parentheses. Such symbols or numbers as above may be handled as compound characters, similarly to a character with the dakuten or handakuten mark. A character string may also include characters in a language other than Japanese. Characters in languages other than Japanese may include characters composed of plural elements, such as Latin characters with accent marks and Hangul characters. Such characters as above may be handled as compound characters, similarly to a character with the dakuten or handakuten mark. A character string may also include Japanese kanji characters. Some kanji characters include characters made up of radicals on the left side ("hen") and radicals on the right side ("tsukuri"). These kanji characters may be handled as compound characters, similarly to a character with the dakuten or handakuten mark.

In this manner, a compound character may not necessarily be a character with the dakuten or handakuten mark. A compound character may be a character composed of plural elements (including symbols and numbers). The term "element", as used herein, refers to a part of a compound character that may possibly be spaced apart from another part of the compound character. Therefore, plural elements making up a single compound character are generally separate components. In addition, each element may be a character that is also usable alone.

Figure 10A:
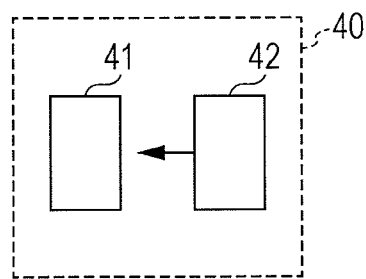
FIGS. 10A and 10B illustrate characters making up a compound character according to a modification.
Figure 10B:
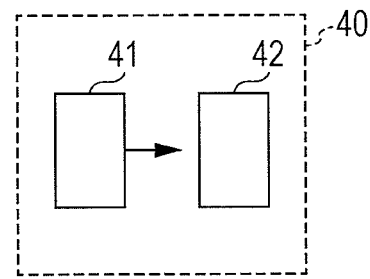

Here, a concept of a process performed on a character string including a compound character as above will be described. FIGS. 10A and 10B illustrate characters 41 and 42 making up a compound character 40. The character 41 is an element on the left side of the compound character 40. The character 42 is an element on the right side of the compound character 40. Each of the characters 41 and 42 is written in one writing box. In this case, the controller 11 specifies a character satisfying predetermined conditions for determining one element of the compound character 40 from a character string represented by input data. The conditions may represent the features of the element, and may include, for example, the position and the number of strokes of the element. Alternatively, the controller 11 may perform pattern matching to specify a character similar to one element of the compound character 40. Then, the controller 11 moves the specified character so that the specified character and a character that is another element may be close to each other. For example, if the features of the element on the left side of the compound character 40 are used as conditions, the character 41 is specified. In this case, as illustrated in FIG. 10B, the character 41 is moved to the right so that the specified character 41 and the character 42 may be close to each other. If the features of the element on the right side of the compound character 40 are used as conditions, the character 42 is specified. In this case, as illustrated in FIG. 10A, the character 42 is moved to the left so that the specified character 42 and the character 41 may be close to each other.

According to the above process, for example, if a character string includes the "degree Celsius" symbol, the character "C" on the right side of the symbol or small circle in the upper left of the symbol is moved so that the character "C" and the small circle may be close to each other. The movement of the character "C" or the small circle reduces the distance between the small circle and the character "C" making up the "degree Celsius" symbol, thus allowing the reader to easily recognize the characters as a single compound character. Further, if a character string includes a kanji character made up of a "hen" radical and a "tsukuri" radical, the "hen" radical of the kanji character or the "tsukuri" radical of the kanji character are moved so that the "hen" and "tsukuri" radicals may be close to each other. The movement of the "hen" or "tsukuri" radical reduces the distance between the "hen" and "tsukuri" radicals making up the kanji character, thus allowing the reader to easily recognize the aggregate of radicals as a single compound character.

Figure 11A:
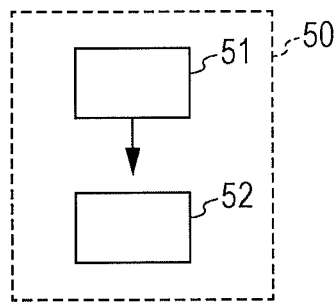
FIGS. 11A and 11B illustrate characters making up a compound character according to another modification.
Figure 11B:
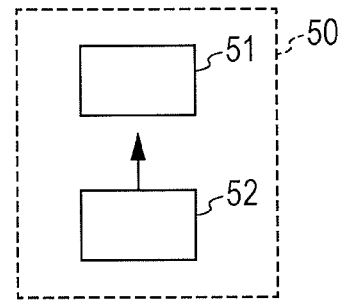

FIGS. 11A and 11B illustrate characters 51 and 52 making up a compound character 50. The character 51 is an element in the upper portion of the compound character 50. The character 52 is an element in the lower portion of the compound character 50. Each of the characters 51 and 52 is written in one writing box. In this case, the controller 11 specifies a character satisfying predetermined conditions for determining one element of the compound character 50 from a character string represented by input data. The conditions may represent the features of the element, and may include, for example, the position and the number of strokes of the element. Alternatively, the controller 11 may perform pattern matching to specify a character similar to one element of the compound character 50. Then, the controller 11 moves the specified character so that the specified character and a character that is another element may be close to each other. For example, if the features of the element in the upper portion of the compound character 50 are used as conditions, the character 51 is specified. In this case, as illustrated in FIG. 11A, the character 51 is moved downward so that the specified character 51 and the character 52 may be close to each other. If the features of the element in the lower portion of the compound character 50 are used as conditions, the character 52 is specified. In this case, as illustrated in FIG. 11B, the character 52 is moved upward so that the specified character 52 and the character 51 may be close to each other.

According to the above process, for example, if a character string includes a Latin character with an accent mark, for example, the accent mark is moved so that the accent mark in the upper portion of the Latin character and the character in the lower portion of the Latin character may be close to each other. The movement of the accent mark reduces the distance between the character that is a part of the Latin character and the accent mark, thus allowing the reader to easily recognize the character and the mark as a single compound character.

A compound character may also be composed of three or more elements. If the number of elements is represented by M, the controller 11 specifies a character that is likely to include at least M-1 elements, and moves the specified character so that the specified character and a character that is another element may be close to each other.

Second Modification

In the foregoing exemplary embodiment, in step S4, the i-th character is moved until the rectangular boundary of the i-th character and the rectangular boundary of the (i-1)-th character join together. However, a character may not necessarily be moved until the rectangular boundaries join together. Furthermore, if the i-th character and the (i-1)-th character do not overlap each other, a character may be moved until the rectangular boundaries of the i-th character and the (i-1)-th character overlap each other. Further, both the i-th character and the (i-1)-th character may be moved. Therefore, the controller 11 may move a character or characters so that a character that is probably one element of a compound character and a character that is another element of the compound character may join together.

Third Modification

In the foregoing exemplary embodiment, a character that is likely to be a diacritical mark is specified using conditions that the character is in the upper two thirds of the writing box and is made up of two strokes or less. Alternatively, for example, pattern matching may be performed on the i-th character and a diacritical mark to specify a character that is likely to be a diacritical mark.

Fourth Modification

The information contained in the dictionary 120 is not limited to names of persons, and the dictionary 120 may contain other information, for example, character strings included in text made available on the Internet. Further, the transition probabilities described in the dictionary 120 may be determined in advance by learning a large volume of text.

Fifth Modification

In the foregoing exemplary embodiment, contextual processing is performed based on the relevance between a character to be recognized and a character preceding the character to be recognized. Alternatively, contextual processing may be performed based on the relevance between a character to be recognized and a character subsequent to the character to be recognized. In this case, the dictionary 120 may contain a value representing a degree of probability that one character of a character string will be preceded by another character. Further, the controller 11 performs contextual processing by recognizing the character string from the back. Therefore, the controller 11 may recognize a character string based on the relationship between adjacent characters.

Sixth Modification

The character recognition apparatus 1 may be configured to recognize a character string written in a sheet of paper. Plural writing boxes may be printed on a sheet of paper in advance. A user fills in the plural writing boxes with the user's own handwriting to write a character string in the plural writing boxes. A scanner apparatus optically reads the character string handwritten on the sheet of paper, and inputs data representing the character string to the character recognition apparatus 1. The character recognition apparatus 1 performs the process described above on the basis of the data input from the scanner apparatus. The scanner apparatus may be integrally provided with the image forming apparatus described above. In this case, the character recognition apparatus 1 may be provided in the image forming apparatus.

Seventh Modification

The character recognition apparatus 1 may be configured to recognize a character string input using a coordinate input device such as a tablet or a touch panel. The coordinate input device displays plural writing boxes. A user fills in the plural writing boxes with the user's own handwriting using, for example, a dedicated pen to write a character string in the plural writing boxes. The coordinate input device detects the movement of the pen, and inputs time-series coordinate data representing the detected movement to the character recognition apparatus 1. The character recognition apparatus 1 performs the process described above on the basis of the time-series coordinate data input from the coordinate input device. In this case, the character recognition apparatus 1 may perform character recognition using the stroke order of a character in addition to the shape of the character.

Eighth Modification

In the foregoing exemplary embodiment, a character is written in a separate area defined by a writing box. However, the writing box may not necessarily be used. For example, a character may be written in a separate area having a color different from other areas.

Ninth Modification

The acquisition unit 21, the specification unit 22, the movement unit 23, and the integration unit 24 may be provided in a housing separate from a housing in which the recognition engine 25 is provided. In this case, data representing a character string in which the movement unit 23 has moved a character is sent to the recognition engine 25. The recognition engine 25 recognizes the character string represented by the sent data in accordance with a character recognition method specified in step S3 or S5.

Tenth Modification

The controller 11 may include an application specific integrated circuit (ASIC). In this case, the functions of the controller 11 may be implemented by the ASIC, or may be implemented by both a CPU and the ASIC.

Eleventh Modification

A program implementing the functions of the controller 11 may be provided in such a manner that the program is stored in a computer-readable medium such as a magnetic medium (such as a magnetic tape, a magnetic disk (such as a hard disk drive (HDD) or a flexible disk (FD))), an optical medium (such as an optical disk (compact disc (CD) or a digital versatile disk (DVD))), a magneto-optical medium, or a semiconductor memory, and may be installed into the character recognition apparatus 1. The program may also be downloaded via a communication line and may be installed into the character recognition apparatus 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character recognition apparatus comprising:
    an acquisition unit that acquires data representing a character string written in a plurality of separate areas of a character recognition device;
    a memory that stores the data representing the character string;
    a specification unit that specifies an element of a compound character satisfying a predetermined condition for determining the compound character from the character string;
    a movement unit that moves the element of the compound character close to an adjacent character;
    a recognition unit that recognizes a changed character string in which the movement unit has moved the element of the compound character, based on a shape of characters and relevance between adjacent characters; and
    an integration unit that integrates the plurality of separate areas, wherein
    the integration unit integrates an area where the moved element of the compound character is written and an area where the adjacent character is written, and
    the recognition unit specifies recognition candidates as a single character based on the shape of the character to be recognized when the character to be recognized is written in an area that is not integrated by the integration unit, and specifies the recognition candidates as the single character or as a plurality of characters based on the shape of the character to be recognized when the character to be recognized is written in an area that is integrated by the integration unit.

2. The character recognition apparatus according to claim 1, wherein the memory that stores a value indicating appearance probability of a second character that follows a first character, and
    wherein the recognition unit recognizes the changed character string, by specifying a plurality of candidates of the second character based on a shape of the characters, and by selecting a character having highest appearance probability from the candidates in accordance with the value stored in the memory.

3. The character recognition apparatus according to Claim 1, wherein the element of the compound character is a diacritical mark, and
    the movement unit moves the diacritical mark close to the adjacent character.

4. The character recognition apparatus according to claim 2, wherein the element of the compound character is a diacritical mark, and
    the movement unit moves the diacritical mark close to the adjacent character.

5. The character recognition apparatus according to claim 1, wherein the element of the compound character is a diacritical mark, and
    the movement unit moves the diacritical mark close to the adjacent character.

6. The character recognition apparatus according to Claim 1, wherein the predetermined condition includes a position of a character and a number of strokes of a character.

7. The character recognition apparatus according to claim 3, wherein the predetermined condition includes a position of a character and a number of strokes of a character.

8. The character recognition apparatus according to claim 4, wherein the predetermined condition includes a position of a character and a number of strokes of a character.

9. The character recognition apparatus according to claim 5, wherein the predetermined condition includes a position of a character and a number of strokes of a character.

10. The character recognition apparatus according to claim 1, wherein the movement unit moves the element of the compound character close to the adjacent character in a horizontal direction or in a vertical direction.

11. The character recognition apparatus according to claim 1, wherein the acquisition unit acquires data representing the character string from image data.

12. The character recognition apparatus according to claim 11, wherein the image data includes handwriting data.

13. A character recognition method comprising:
    acquiring data representing a character string written in a plurality of separate areas of a character recognition device;
    storing the data representing the character string in a memory;
    specifying an element of a compound character satisfying a predetermined condition for determining the compound character from the character string;

moving the element of the compound character close to an adjacent character;

recognizing a changed character string in which the element of the compound character has been moved, based on a shape of characters and relevance between adjacent characters; and integrating the plurality of separate areas, wherein the integrating integrates an area where the moved element of the compound character is written and an area where the adjacent character is written, and wherein the recognizing specifies recognition candidates as a single character based on the shape of the character to be recognized when the character to be recognized is written in an area that is not integrated by the integrating, and specifies the recognition candidates as the single character or as a plurality of characters based on the shape of the character to be recognized when the character to be recognized is written in an area that is integrated by the integrating.

14. A non-transitory computer readable medium storing a program causing a computer to execute a process, the process comprising:

acquiring data representing a character string written in a plurality of separate areas of a character recognition device;

storing the data representing the character string in a memory;

specifying an element of a compound character satisfying a predetermined condition for determining the compound character from the character string;

moving the element of the compound character close to an adjacent character;

recognizing a changed character string in which the element of the compound character has been moved, based on a shape of characters and relevance between adjacent characters; and integrating the plurality of separate areas, wherein the integrating integrates an area where the moved element of the compound character is written and an area where the adjacent character is written, and wherein the recognizing specifies recognition candidates as a single character based on the shape of the character to be recognized when the character to be recognized is written in an area that is not integrated by the integrating, and specifies the recognition candidates as the single character or as a plurality of characters based on the shape of the character to be recognized when the character to be recognized is written in an area that is integrated by the integrating.

* * * * *